United States Patent [19]

Okina

[11] 4,455,340
[45] Jun. 19, 1984

[54] FLEXIBLE MOLDED FOAM AND PROCESS FOR PREPARATION THEREOF

[75] Inventor: Toyohiko Okina, Anjo, Japan

[73] Assignee: Inoue MTP Kabushiki Kaisha, Nagoya, Japan

[21] Appl. No.: 507,939

[22] Filed: Jun. 24, 1983

Related U.S. Application Data

[63] Continuation of Ser. No. 340,660, Jan. 19, 1982, abandoned.

[30] Foreign Application Priority Data

Jul. 31, 1981 [JP] Japan ............................. 56-120992

[51] Int. Cl.³ .............................................. B32B 3/26
[52] U.S. Cl. .................................. 428/215; 264/46.6; 428/318.6; 428/423.3
[58] Field of Search ............ 264/46.6; 428/215, 318.4, 428/318.6, 318.8, 423.3

[56] References Cited

U.S. PATENT DOCUMENTS

| | | | |
|---|---|---|---|
| 2,893,063 | 7/1959 | Hoppe | 264/45.3 |
| 3,042,137 | 7/1962 | Mathues et al. | 264/46.6 |
| 3,487,134 | 12/1969 | Burr | 428/318.6 |
| 3,555,130 | 1/1971 | Feuer et al. | 264/46.6 |
| 3,586,649 | 6/1971 | Cobbledick | 428/318.8 |
| 3,650,880 | 3/1972 | Tieniber | 428/318.6 |
| 3,752,695 | 8/1973 | Finelli | 428/318.8 |
| 3,873,407 | 3/1975 | Kumata et al. | 428/318.6 |
| 3,887,735 | 6/1975 | Laberinti | 428/315.7 |
| 4,209,564 | 6/1980 | Nomura et al. | 428/318.8 |
| 4,242,410 | 12/1980 | König et al. | 428/319.7 |
| 4,294,880 | 10/1981 | Nishida | 428/318.8 |
| 4,389,454 | 6/1983 | Horacek et al. | 428/318.6 |

FOREIGN PATENT DOCUMENTS 1190974 5/1970 United Kingdom.

*Primary Examiner*—William J. Van Balen
*Attorney, Agent, or Firm*—Armstrong, Nikaido, Marmelstein & Kubovcik

[57] ABSTRACT

A flexible molded foam comprises a surface layer of elastic thin film, an intermediate reinforcing layer of elastic film and a core layer. The surface layer comprises a linear polymer, the intermediate reinforcing layer comprises a three-dimensionally crosslinked polyurethane and the core layer is composed of a semi-rigid polyurethane foam. These elements are integrally molded in a desirable shape.

26 Claims, 5 Drawing Figures

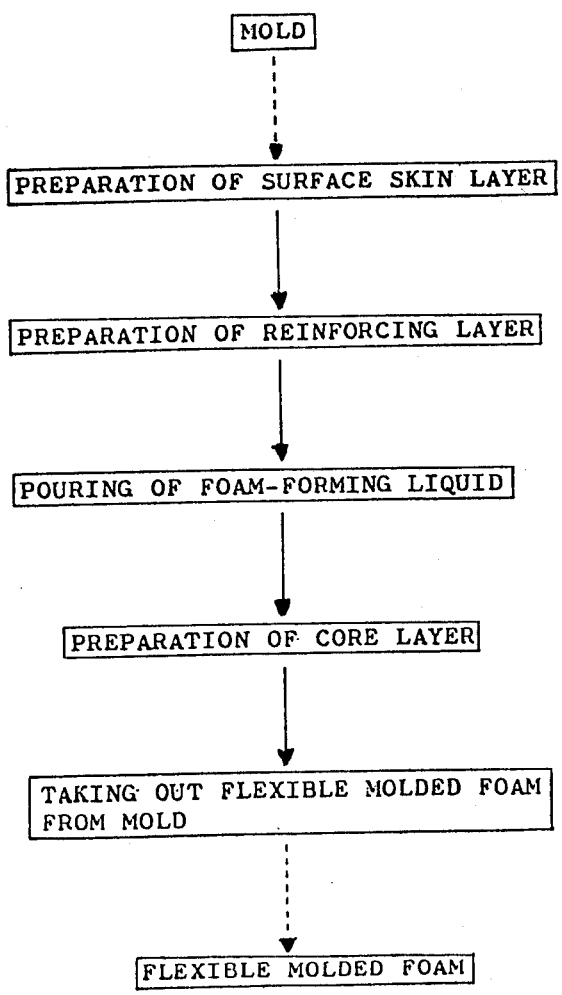

FLEXIBLE MOLDED FOAM AND PROCESS FOR PREPARATION THEREOF

This application is a continuation of application Ser. No. 340,660, filed Jan. 19, 1982, now abandoned.

BACKGROUND OF THE INVENTION

1. Field of the Invention

The present invention relates to a flexible molded foam. More particularly, it relates to a flexible molded foam which comprises a surface layer comprising a linear polymer, an intermediate reinforcing layer comprising a three-dimensionally crosslinked polyurethane and a core layer composed of a semi-rigid polyurethane foam, and a process for the preparation of such a flexible molded foam.

2. Description of the Prior Art

A flexible molded foam comprising a core layer composed of a polyurethane foam has been used as a cushioning material. A surface skin layer has been attached to said core layer as an outer decorative material, and is widely used as an interior decorative material in, for example, an automobile or other vehicle.

One type of decorative material is a product obtained by first preparing an outer decorative material as a surface skin layer by a separate step of vacuum molding or the like, and then attaching this outer decorative material to a polyurethane foam. Another product is obtained by attaching a coating film as a surface layer to a self-skin-foaming flexible foam which is a special polyurethane foam.

However, it is very difficult to first prepare an outer decorative material as a surface skin layer by a separate step because, due to the properties of this outer decorative material, it is very difficult to form a fine surface pattern, such as a leather or texture-embossed pattern or a stitched pattern. Also, the self-skin-forming flexible foam is low in foaming ratio and has a high density. Therefore, the resulting foam has a heavy weight and lacks flexibility and, accordingly, it is not preferred from an economical viewpoint. Moreover, strict manufacturing conditions should be utilized for obtaining this foam.

SUMMARY OF THE INVENTION

The primary object of the present invention is to provide a flexible molded foam and a process for preparation thereof in which a flexible moled foam comprises at least 3 layers which are integrally molded into a desirable shape, including a fine surface pattern, in one mold.

Another object of the present invention is to provide a flexible molded foam being light weight, soft and elastic.

Still another object of the present invention is to prepare a flexible molded foam, economically and advantageously without any strict preparation conditions.

BRIEF DESCRIPTION OF THE DRAWINGS

FIG. 5 is a diagram illustrating the steps for preparing the flexible molded foam according to the present invention.

DETAILED DESCRIPTION OF THE INVENTION

Figure 1:
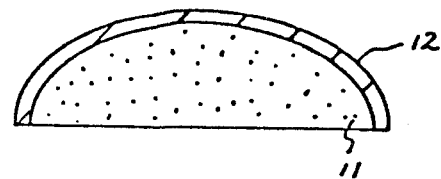
FIG. 1 is a sectional view of a conventional flexible molded foam.
Figure 2:
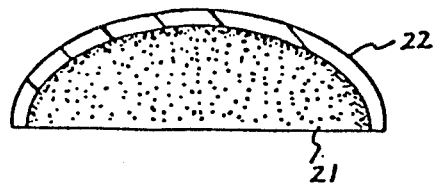
FIG. 2 is a sectional view of another conventional flexible molded foam.

FIGS. 1 and 2 are sectional views illustrating conventional flexible molded foams. More specifically, FIG. 1 shows a product obtained by bonding an outer decorative material 12, obtained by vacuum molding in a prior and separate step, to a semi-rigid polyurethane foam 11 which is a flexible foam. FIG. 2 illustrates a product obtained by forming a coating layer 22 on a self-skin-forming flexible foam 21. These conventional products have the defects discussed above.

Figure 3:
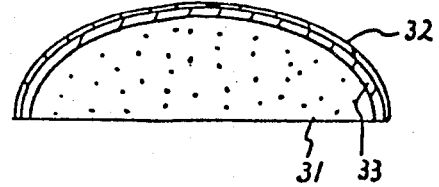
FIG. 3 is a sectional view showing an embodiment of the flexible molded foam according to the present invention.

As is seen from FIG. 3, which is a sectional view showing one embodiment of the flexible molded foam of the present invention, the product of the present invention comprises a semi-rigid polyurethane foam 31, an intermediate reinforcing layer 33 and a surface layer 32 on the semi-rigid polyurethane foam 31 above the intermediate reinforcing layer 33. These three layers 31,32,33 are integrally molded in one mold. In another embodiment of the flexible molded foam of the present invention which is illustrated in the sectional view of FIG. 4, an insert for reinforcing 44 made of metal or plastic providing attachments 44a and 44b for fixing to the body of an automobile is inserted in a semi-rigid polyurethane foam 41 and molded integrally with an intermediate reinforcing layer 43 and a surface layer 42 in one mold. The reinforcing element 44 may be steel, stainless steel, aluminum alloy, etc. The plastic for the reinforcing element 44 may be ASG (glass reinforced acrylonitrile-styrene resin), ABS, polypropylene, polyethylene, etc.

The surface layer 32 or 42 will be described first.

The surface layer 32 or 42 comprises a linear polymer having a number average molecular weight of 25,000 to 55,000 and is in the form of an elastic thin film having a thickness of 7 to 50μ. The linear polymer is represented by a polyurethane obtained by reaction between a bifunctional polyol and an aliphatic diisocyanate. As the bifunctional polyol, there can be mentioned, for example, a polyester polyol obtained by a reaction between a dibasic acid such as adipic acid or phthalic acid, and a dihydric alcohol such as ethylene glycol, diethylene glycol or propylene glycol; a lactone polyester which is a ring-opened polymer of ε-caprolactone; and polyether polyol. The aliphatic diisocyanate may contain an alicyclic group in the isocyanate residue but should be free of a benzene nucleus. However, the aliphatic diisocyanate may contain a benzene nucleus in the isocyanate group only through an aliphatic hydrocarbon group. Representative aliphatic diisocyanates are hexamethylene diisocyanate, isophorone diisocyanate, m-xylene diisocyanate, tetramethylene diisocyanate and 1,4-cycleohexane diisocyanate. At least one member selected from these diisocyanates is used in the present invention.

For the preparation of the above-mentioned linear polymer having a number average molecular weight of 25,000 to 55,000, a bifunctional polyol having a molecular weight of 1,000 to 2,000 is preferably used. However, the preferred molecular weight differs according to the kinds of polyol and diisocyanate used as ingredients and the reaction conditions. If such a bifunctional polyol is employed, a linear polymer having excellent properties for the surface layer or outer decorative substance can be obtained. From this viewpoint, a polyester diol having two hydroxyl groups on the molecule ends thereof is especially preferred. In the present invention, it is particularly preferred to use, as the linear polymer, a polyurethane having free isocyanate groups on the molecule ends thereof which is obtained by reacting a bifunctional polyol such as that mentioned above with an aliphatic diisocyanate in a slight excess of the stoichiometric amount. The surface layer 32 or 42 composed of such a polyurethane can be bonded very tightly to the intermediate reinforcing layer 33 or 43 which is described in detail hereinafter.

Molding of the surface layer 32 or 42 is accomplished by spray-coating a solvent diluted solution of said linear polymer on the inner surface of mold having a desirable shape, and then evaporating the solvent from the coating. Coloring pigment and other additives such as an aging-retardant may be incorporated into the solvent diluted solution. A mold having a desirable shape, including a fine surface pattern such as a leather or texture-embossed pattern or a stitched pattern, may be used as a mold. For the solvent, there can be used, for example, methylethyl ketone, methylisobutyl ketone, ethyl acetate, xylene, toluene, isopropyl alcohol, methanol and acetone. When antioxidants and ultraviolet absorbers represented by the following formulae (1)–(6) are incorporated into the solvent diluted solution, the aging resistance can be especially highly improved.

(1) Tinuvin P (trademark for the product supplied by Ciba-Geigy):

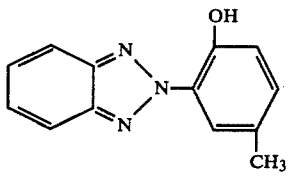

(2) Tinuvin 326 (trademark for the product supplied by Ciba-Geigy):

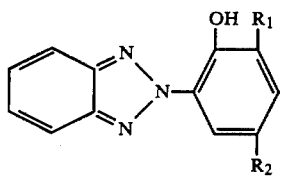

(3) Irganox 1010 (trademark for the product supplied by Ciba-Geigy):

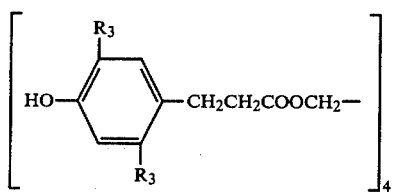

wherein $R_3$ indicates a t-butyl group.

(4) Thanol 770 (trademark for the product supplied by Ciba-Geigy):

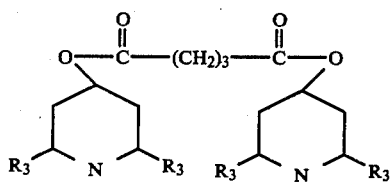

wherein $R_3$ indicates a t-butyl group.

(5) BHT:

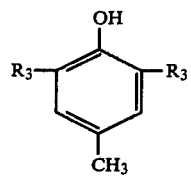

wherein $R_3$ indicates a t-butyl group.

(6) BHA:

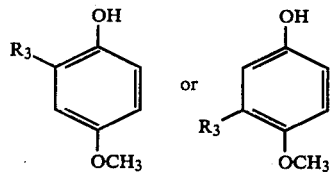

wherein $R_3$ indicates a tert-butyl group

The degree of dilution with the solvent and the extent of spray coating are such that the dilution is effected so that the solid content which contains the linear polymer, coloring pigment, aging-retardant and other additives is 5 to 20% and the spray coating is effected on the surface of the mold so that the amount coated of the solids is 0.7 to 6.5 mg/cm$^2$. Generally, in order to form a surface layer on the inner surface of a mold having a surface area of 1 m$^2$, the solvent dilution coating should comprise 6.8 to 64.9 or about 65 gram of the linear polymer, 0.0015 to 0.15 gram of an aging retardant, 0.004 to 0.1 gram of a coloring pigment and 28 to 1250 gram of a solvent. Such solvent dilution and spray coating are adopted to as to prevent occurrence of an undesirable phenomenon of cobwebbing due to the very high molecular weight of the linear polymer. The foregoing dilution and coating conditions are optimum for formation of the surface layer 32 or 42, which is an elastic thin film having a thickness of 7 to 50μ.

The so-formed surface layer 32 or 42 is generally characterized by a 100% tensile modulus of 1.2 Kg/mm$^2$ on the average, a tensile strength of 2.5 Kg/mm$^2$ on the average and an elongation of 400% on the average. The weatherability of the surface layer 32 or 42 is such that when it is tested by a sunshine type weather-ometer at 90° C. for 400 hours, the appearance is not changed and the elongation is 250%. The heat resistance of the surface layer 32 or 42 is such that when it is treated at 120° C. for 450 hours, the appearance is not changed and the elongation is 300%. In view of the functions required for the surface layer 32 or 42 acting as the outer decorative substance of the final flexible molded foam, it is important that the surface layer 32 or 42 should have the above-mentioned weatherability and heat resistance and should exibit a sufficient elongation without deterioration of appearance characteristics, such as discoloration. In view of the foregoing physical properties, it is preferred that the 100% modulus of the surface layer be 0.8 to 1.4 Kg/mm$^2$.

The intermediate reinforcing layer 33 or 43 formed between the surface layer 32 or 42 and the core layer 31 or 41 described hereinafter will now be described:

The intermediate reinforcing layer 33 or 43 comprises a three-dimensionally crosslinked polyurethane and is in the form of an elastic film having a thickness of 100 to 500$\mu$. The three-dimensionally crosslinked polyurethane can be a polymer obtained by a reaction between an organic diisocyanate and a polyol, at least a part of which is composed of a trifunctional polyol or a polyol having a higher functionality. The organic diisocyanate includes an aliphatic diisocyanate and an aromatic diisocyanate. The organic diisocyanate may be hexamethylene diisocyanate, isophorone diisocyanate, m-xylene diisocyanate, phenylene diisocyanate, tolylene diisocyanate, diphenylmethane diisocyanate and naphthalene diisocyanate. At least one member selected from these diisocyanates is appropriately used.

As the polyol, there can be mentioned two types, namely a first polyol capable of forming a urethane prepolymer having free isocyanate groups on the molecule ends by reaction with the above-mentioned organic diisocyanate and a second polyol free of such property. The first and second polyols can be a polyester polyol which is a triol obtained by condensation reaction of a dibasic acid, such as adipic acid or phthalic acid, with a dihydric alcohol, such as ethylene glycol, diethylene glycol or propylene glycol and, further, with a small amount of a trihydric alcohol, such as glycerin or hexanetriol. The first and second polyols may also be a polyester polyol which is the same diol as described above with respect to the surface skin layer 32 or 42; a polyether polyol which is a triol obtained by an addition reaction of trimethylol propane or glycerin as the reaction initiator, with ethylene oxide or propylene oxide; a polyether polyol which is a diol obtained as a homopolymer or copolymer from ethylene oxide, propylene oxide or other alkylene oxide; and a tetrafunctional polyol or polyol having a higher functionality other than the above-mentioned bifunctional and trifunctional polyols. In the present invention, it is indispensable that a part of at least one of the first and second polyol should be composed of a trifunctional polyol or a polyol having a higher functionality. Generally, the functional group number of the first and second polyol is 2.0 to 3.0 on the average. Typically, therefore, if the first polyol is a bifunctional polyol, at least a part of the second polyol is trifunctional and, if the first polyol contains a trifunctional polyol, the second polyol is a bifunctional polyol.

In the preparation of the three-dimensionally crosslinked polyurethane constituting the intermediate reinforcing layer 33 or 43, the reaction ratio of the first polyol relative to the urethane prepolymer having free isocyanate groups on the molecule ends to the organic diisocyanate is such that the amount of the organic diisocyanate is 1.5 to 4.0 equivalents per equivalent of the first polyol. However, this reaction ratio differs to some extent according to the kinds of the first and second polyols and the organic diisocyanate and the reaction conditions. If this reaction ratio is utilized, it is possible to form a three-dimensionally crosslinked polyurethane suitable in view of its relationship to the surface layer 32 or 42 and excellent in the resistance characteristics required for the intermediate reinforcing layer 33 or 43. In order to obtain a desirable three-dimensionally crosslinked polyurethane, it also is preferred that the first polyol be reacted with the organic diisocyanate at a reaction ratio so that the content of free isocyanate groups in the urethane prepolymer is 5 to 10%. Moreover, it is preferred that the average equivalent weight per functional groups of the first and second polyols to be in the range of from 200 to 1,500.

Formation of the intermediate reinforcing layer 33 or 43 is accomplished by spray-coating a solvent diluted solution of the urethane prepolymer and second polyol on the surface layer 32 or 42. Coloring pigment and other necessary additives may be incorporated in the solvent dilution. The solvents mentioned above for the formation of the surface layer may be used.

The degree of solvent dilution and the extent of spray coating are such that the solid content which contains the urethane prepolymer, second polyol, coloring pigment and other additives is 30 to 80% and the amount of solid content on the surface layer 32 or 42 is 10 to 75 mg/cm$^2$. Generally, in order to form an intermediate layer on the inner surface of a mold having a surface area of 1 m$^2$, the solvent dilution coating should comprise 10 to 700 gram of the urethane prepolymer, 5.5 to 350 gram of the second polyol, 0 to 15 gram of an aging retardant, 0.01 to 0.1 gram of a catalyst or other additive and 25 to 1750 gram of a solvent. When these solvent dilution and spray coating conditions are utilized, it is very easy to adjust the thickness of the reinforcing layer 33 or 43 to 100 to 500$\mu$ on one hand. Also, if a solvent diluted solution having a high resin content is spray-coated, especially in the case where a mold capable of forming a fine surface pattern is used, a filling-up effect can be achieved to concave portions of the mold surface by the resin whereby the semi-rigid polyurethane foam-forming liquid to be poured into the mold afterward is allowed to flow smoothly in the mold and the formation of undesirable air voids can be prevented.

The so-obtained intermediate reinforcing layer 33 or 43 is generally characterized by a 100% tensile modulus of 0.5 Kg/mm$^2$ on the average, a tensile strength of 2.0 Kg/mm$^2$ on the average and an elongation of 300% on the average. The weatherability and heat resistance are maintained at satisfactory levels by the above-mentioned surface layer 32 or 42. It is preferred that the 100% modulus of the intermediate reinforcing layer 33 or 43 be 0.3 to 0.8 Kg/mm$^2$ and the elongation of the reinforcing layer 33 or 43 be 200 to 350%. If these requirements are satisfied, the intermediate reinforcing layer 33 or 43 acts in a preferable state as a reinforcing substance between the surface layer 32 or 42 and the core layer 31 or 41 described hereinafter and the layer 33 or 43 exhibits a softness and elasticity desirable for the final flexible molded foam.

The core layer 31 or 41 formed on the reinforcing layer 33 or 43 will now be described in detail:

The core layer 31 or 41 is composed of a semi-rigid polyurethane foam having an apparent density of 0.03 to 0.30 g/cm$^3$. Such semi-rigid polyurethane foam may be prepared from polyols, polyisocyanates, blowing agents and other necessary additives according to well-known procedures.

Figure 4:
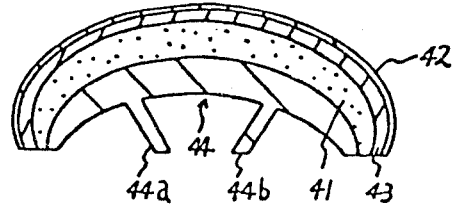
FIG. 4 is a sectional view showing another embodiment of the flexible molded foam according to the present invention having integrated therein an insert for reinforcing made of metal or plastic.

More specifically, formation of the core layer 31 or 41 is accomplished by pouring a semi-rigid polyurethane foam-forming liquid containing the above ingredients onto the already-formed reinforcing layer 33 or 43 in the mold by a one-shot process or the like, closing the mold and allowing foam-forming liquid to react and cure at a fixed temperature for a fixed time. Thereafter, the resulting foam is released and taken out from the mold. Formation of the final flexible molded form as shown in FIG. 3 is accomplished by simultaneous formation of the core layer 31 or 41 with the intermediate reinforcing layer 33 or 43 and the surface skin layer 32 or 42. When an insert for reinforcing, such as formed metal or plastic, is appropriately positioned in the mold, a final product as shown in FIG. 4 can be obtained.

The kinds of ingredients such as polyol and polyisocyanate and the reaction conditions for obtaining the semi-rigid polyurethane composition the core layer 31 or 41 are not particularly limited in comparison with the conventional forming conditions. Since the core layer 31 or 41 integrally supports the surface layer 32 or 42 and the intermediate reinforcing layer 33 or 43 and acts as a cushioning material in the final flexible molded foam, it is preferred that the semi-rigid polyurethane foam be light in weight and excellent in softness and elasticity. From this viewpoint, it is preferred that the amount of the semi-rigid polyurethane foam-forming liquid be such that the volume of the foam obtained by foaming in an open vessel is not larger than 5.5 times the volume of the inner cavity of the mold. In other words, the overpack ratio should not be larger than 5.5. Also, this foam-forming liquid should not contain a halogenated hydrocarbon as a blowing agent in an amount larger than 10%. Moreover, the temperature of the mold should preferably be higher than 35° C. when this liquid is poured.

When the so-formed core layer 31 or 41 is compared with the self-skin-forming flexible foam 21 of the conventional product shown in FIG. 2, it is seen that both the foam layers are different from each other in the following point. The overpack ratio of the present invention at the molding step can be 2.67 whereas, in the conventional product, the overpack ratio is 5.0. Because the compositions of the foam-forming liquid poured are different from each other in the conventional product and in the present invention, the apparent density of the present invention after molding is 0.16 g/cm³ whereas the apparent density of the conventional product after molding is 0.60 g/cm³.

The curing conditions for producing the flexible molded foam of the invention are set forth below:

|  |  | General Range | Preferred Range |
| --- | --- | --- | --- |
| A. | Mold Temperature | 30–70° C. | 40–60° C. |
| B. | Surface layer | 15–120 sec. | 30–60 sec. |
| C. | Intermediate layer | 1.5–6 min. | 2–4 min. |
| D. | Core layer | 1.5–6 min. | 2–4 min. |

B is the time from the completion of the coating of the surface layer to the initiation of the coating of the intermediate layer.

C is the time from the completion of the coating of the intermediate layer to the initiation of the pouring of the core layer.

D is the time from completion of pouring of the core layer to demolding of the molded product.

FIG. 5 is a diagram illustrating the steps for preparing the above-mentioned flexible molded foam according to the present invention. Namely, a surface layer is first prepared in a mold having a desirable shape, an intermediate reinforcing layer is then formed on this suface and, finally, a semi-rigid polyurethane foam-forming liquid is poured onto this intermediate reinforcing layer to form a core layer. The three layers are then simultaneously integrated with one another. Thereafter, the obtained foam is removed from the mold to obtain a flexible molded foam as a final product.

The so-obtained flexible molded foam of the present invention has the following excellent properties: The heat resistance is such that when the foam is heated in a thermostat tank maintained at 120° C. for 450 hours and subjected to a bending test at a bending angle of 180°, defects such as pinholes or cracks are not formed on the surface. Also, the weatherability of the product of the present invention is such that when the foam is treated at 90° C. for 450 hours in a sunshine type weather-ometer and subjected to the same bending test, pinholes or cracks are not observed on the surface. The soft touch characteristic is such that the surface hardness as determined by a C-type hardness meter is preferably 30° to 55°.

As will be apparent from the foregoing description, the following effects can be attained by the present invention:

(1) By the combination of the surface layer, which is an elastic thin film, and the intermediate reinforcing layer, which is a thicker elastic film, and especially by the filling-up effect of the reinforcing layer, a fine and sharp surface pattern which heretofore could not be formed according to the conventional techniques can be obtained. The present invention can form fine and sharp surface patterns, such as a leather or textire embossed pattern or stitched pattern.

(2) Since the surface layer comprising a linear polymer is supported by the intermediate reinforcing layer comprising a three-dimensionally crosslinked polymer, there can be obtained a product having excellent properties, such as heat resistance and weatherability.

(3) Since a semi-rigid polyuretane foam is used for the core layer, the hardness can be appopriately selected; for example, the hardness can be reduced. The combination of selection of hardness with the softness of the reinforcing effect results in a product having a soft touch as a whole.

(4) Since a semi-rigid polyurehane foam is used for the core layer, the overpack ratio and density of the core layer are low and the entire weight can be reduced. Accordingly, the product of the present invention is advantageous from the economical viewpoint.

(5) Since a semi-rigid polyurethane foam is used for the core layer, special ingredients and preparation conditions which are normally required for a self-skin-forming flexible foam are not necessary for preparing the semi-rigid polyurethane foam.

(6) Since the surface layer, intermediate reinforcing layer and core layer are integrally molded in one mold, a separate, preliminary vacuum molding step or the like is not necessary and, therefore, the operation efficiency can be enhanced and the labor-saving effect can be attained.

The present invention will now be described in detail with reference to the following two Examples that are by no means intended to limit the scope of the invention. The present invention includes modifications obvious to those skilled in the art, in addition to the embodiments described hereinbefore and these two Examples.

In the following Examples, as well as in the foregoing specification, the physical properties of the various layers and products were determined according to the following methods:

Surface Hardness by C-Type Hardness Meter:

The method for measuring the hardness of a flexible material, stipulated by the Japanese Rubber Association, was adopted. A push needle having columnar shape 2.54 mm in radius and including a spherical surface having a radius of 2.54 mm on the top end thereof was pressed to the surface of the sample. The point of 0 was set at a load where the penetration of the needle was 2.54 mm and the point of 100 was set at a load where the penetration of the needle was 0 mm, and 100 degrees were equally divided between the two points. The relation between the load on the push needle and the hardness (degrees) is shown below:

| Hardness | Load |
|---|---|
| 10° | 135 g |
| 25° | 255 g |
| 50° | 455 g |
| 75° | 655 g |

Heating Test:

The test piece was kept in a thermostat tank for a certain time and the test piece was taken out and the physical properties were measured.

Weather-ometer Test:

The test was carried out according to the method of ASTM E-42.

Bending Test:

The test piece was bent at 180° and straightened again and it was checked to determine whether or not cracks were formed on the bent portion.

Tensile Modulus:

The tensile modulus was determined according to the method of ASTM D-638.

Tensile Elongation:

The tensile elongation was determined according to the method of ASTM D-638.

The materials utilized in the following Examples for preparing the foam-forming liquid are described in the following Table 1, along with the abbreviations used therefor in the Examples.

groups on the molecule ends was prepared by reacting 1 equivalent weight (OH equivalent) of a polyester containing hydroxyl groups on the molecule ends and having an average molecular weight of 2,000, which was derived from adipic acid and diethylene glycol, with 1.1 equivalent weight (isocyanate equivalent) of isophorone diisocyanate and 0.1% of BHT as an antioxidant and a coloring pigment were added to the polymer. Then, 15 parts by weight of the mixture was diluted with 85 parts by weight of methylethyl ketone. The so-formed solution was spray-coated on the releasing agent-treated surface of the mold so that the amount coated of the solids is 2.0 mg/cm$^2$ and the solvent was evaporated to form a surface layer. The same amount of this polymer mixture was sprayed on a glass surface treated with a releasing agent and the solvent was evaporated to prepare a sample for measuring the physical properties of the surface layer.

Then a urethane prepolymer having a free isocyanate group content of 4.5% was prepared by reacting 1 equivalent weight (OH equivalent) of a polyester having an average molecular weight of 2,500 and containing OH groups on the molecule ends, which consisted of 11.5 moles of adipic acid, 12.0 moles of diethylene glycol and 0.5 moles of trimethylol propane, with 2.5 equivalent weight (isocyanate equivalent) of crude 4,4'-diphenylmethane diisocyanate. Then 100 parts by weight of a 50% dilution of this prepolymer with methylethyl ketone was mixed with 50 parts by weight of a 50% polyester solution formed by adding 0.5 part by weight of dibutyl tin dilaurate to 50 parts by weight of a polyester having an average molecular weight of 1,000 and containing OH groups on the molecule ends, which consisted of 4.3 moles of adipic acid and 5.3 moles of diethylene glycol and diluting the mixture with 49.5 parts by weight of methylethyl ketone, and the resulting liquid mixture was spray coated on the surface layer so that the amount coated of the solids was 30 mg/cm$^2$. The solvent was evaporated to form an intermediate reinforcing layer. The same amount of the liquid mixture was sprayed on a glass surface treated with a releasing agent and the solvent was evaporated

TABLE 1

| Abbreviation | Maker | Trademark | Hydroxyl Value (OH Group Number) | Number of Functional Groups | Other Characteristics |
|---|---|---|---|---|---|
| CP-4701 | Dow Chemical | Voranol 4701 | 36 | 3 | polyether polyol obtained by addition polymerication of Po to glycerin and capping of Eo to molecule ends |
| 31-28 | Mitsui-Nisso Urethane | Polymer Polyol 31-28 | 28 | 3 | product obtained by grafting polyacrylonitrile to polyether formed by addition polymerization of Po to glycerin |
| 33LV | Sankyo Air Products | Dabco 33LV | — | — | mixed solution comprising 33% of triethylene diamine and 67% of dipropylene glycol |
| 44V-20 | Sumitomo-Bayer Urethane | Sumidule 440-20 | free NCO content of 30% | — | crude diphenylmethane diisocyanate |
| RQ-500 | Nippon Reinhold | Hiblocks RQ500 | 420 | 4 | polyether polyol obtained by addition polymerization of Po to penetaerythritol |
| NO-33 | Sanyo Chemical Industries | Sannix Polyol NO-33 | 28 | 3 | polyether polyol obtained by addition polymerization of Po to glycerin and capping of Eo to molecule ends |
| NP-400 | Sanyo Chemical Industries | Newpol NP-400 | 700 | 5 | product obtained by addition of Po to diethylene triamine |

Po: propylene oxide
Eo: ethylene oxide

EXAMPLE 1

This Example was carried out by using an electric casting mold of nickel maintained at 50° C.

A linear polymer having an average molecular weight of about 40,000 and containing free isocyanate to obtain a sample for measuring the physical properties of the intermediate reinforcing layer.

A foam-forming liquid comprising 100 parts by weight of polyol mixture having the composition shown below and 55 parts by weight of a polyisocyanate having the composition shown below was poured into the mold in such an amount that the overpack ratio was about 2.5 and the apparent density was 0.06 g/cm³ when it was foamed in an open vessel. Then the mold, which was maintained at 50° C., was closed. After three minutes and thirty seconds, the mold was opened and the resulting foam was demolded. Thus the core layer was formed and, simultaneously, a flexible molded foam comprising the surface layer, the intermediate reinforcing layer and the core layer were integrally molded with one another.

| RECIPE OF POLYOL MIXTURE | |
|---|---|
| CP-4701 | 80 parts by weight |
| 31-28 | 20 parts by weight |
| Water | 2.7 parts by weight |
| 33LV | 0.2 part by weight |
| Triethyl amine | 0.8 part by weight |
| Coloring pigment | 0.5 part by weight |
| (The foregoing ingredients were mixed together to prepare the polyol mixture.) | |

| RECIPE OF POLYISOCYANATE | |
|---|---|
| 44V-20 | 97 parts by weight |
| RQ-500 | 3.0 parts by weight |
| (These two ingredients were mixed and reacted to form a prepolymer having a free isocyanate group content of 28%, which is used as the above-described polyisocyanate.) | |

The core layer of the thus obtained flexible molded foam had an apparent density of 0.16 g/cm³ and a surface hardness of 42° as measured by a C-type hardness meter. Accordingly, the product had a very soft touch and even when the product was heated in a thermostat tank maintained at 120° C. for 600 hours, no peeling was observed between the surface layer and the intermediate reinforcing layer. When the product was subjected to an accelerated weatherability test at 90° C. for 400 hours by a sunshine-type weather-ometer, no discoloration was observed in the surface layer. When the tested product was subjected to a 180° bending test, none of the defects, such as pinholes or cracks, were observed on the surface. The 100% tensile modulus of the surface layer sample was 1.2 Kg/cm² and the 100% tensile modulus and elongation of the intermediate reinforcing layer sample were 0.6 Kg/cm² and 240%, respectively.

EXAMPLE 2

This Example was carried out by using an electric casting mold having a fine leather embossed pattern and stitched pattern, which was maintained at 50° C. according to the following procedures:

The surface layer and intermediate reinforcing layer were formed in the same manner as described in Example 1. Finally, a foam-forming liquid comprising 100 parts by weight of a polyol mixture having the composition described below and 47 parts by weight of a polyisocyanate having the same composition as used in Example 1 was poured and the post treatments were conducted in the same manner as described in Example 1 to obtain a flexible molded foam.

| RECIPE OF POLYOL MIXTURE | |
|---|---|
| NO33 | 80 parts by weight |
| 31-28 | 20 parts by weight |
| Water | 2.2 parts by weight |
| NP-400 | 2.0 parts by weight |
| 33 LV | 1.2 parts by weight |

| RECIPE OF POLYOL MIXTURE | |
|---|---|
| Triethyl amine | 0.2 part by weight |
| Coloring pigment | 0.5 part by weight |
| (The foregoing ingredients were mixed together to prepare the polyol mixture) | |

The flexible molded foam had a fine and sharp leather embossed pattern and stitched pattern manifested on the surface thereof and it had the same good and desirable properties as the product obtained in Example 1.

What is claimed:
1. A flexible molded foam comprising:
   (a) a surface layer of elastic thin film having a thickness of 7 to 50μ, which consists essentially of a polyurethane linear polymer having a number-average molecular weight of 25,000 to 55,000;
   (b) an intermediate reinforcing layer of elastic film having a thickness of 100 to 500μ, which comprises a three-dimensionally crosslinked polyurethane; and
   (c) a core layer which comprises a semi-rigid polyurethane foam having an apparent density of 0.03 to 0.30 g/cm³;
   wherein said layers are integrally molded in a desirable shape and wherein the surface layer and the intermediate reinforcing layer are bonded very tightly by free isocyanate groups on the molecule ends of the polyurethane linear polymer layer present prior to curing.

2. A flexible molded foam as set forth in claim 1 wherein the polyurethane linear polymer of the surface layer is obtained by reaction between a bifunctional polyol and an aliphatic diisocyanate.

3. A flexible molded foam as set forth in claim 2 wherein the polyurethane linear polymer of the surface layer is obtained by reacting a bifunctional polyol having a molecular weight of 1,000 to 3,000 with an aliphatic diisocyanate excessed slightly to the stoichiometric amount.

4. A flexible molded foam as set forth in claim 1 wherein the elastic thin film surface layer has a 100% tensile modulus of 0.8 to 1.4 kg/mm².

5. A flexible molded foam as set forth in claim 1 wherein the three-dimensioally crosslinked polyurethane of the intermediate reinforcing layer is one obtained by reacting an organic diisocyanate with a polyol, at least a part of which is composed of a trifunctional polyol or a polyol having a higher functionality.

6. A flexible molded foam as set forth in claim 1 wherein the 100% tensile modulus of the elastic film of intermediate reinforcing layer is 0.3 to 0.8 kg/mm².

7. A flexible molded foam as set forth in claim 1 wherein the elongation of the elastic film of intermediate reinforcing layer is 200 to 350%.

8. A flexible molded foam as set forth in claim 1 wherein the surface hardness as measured by a C-type hardness meter is 30° to 55°.

9. A flexible molded foam as set forth in claim 1 wherein a reinforcing element of metal or plastic is also integrally molded with said layers.

10. A process for the preparation of flexible molded foam which comprises the steps of:
    (a) coating the surface of mold having a desirable shape with a solvent diluted solution having a solid content of 5 to 20% which consists essentially of a polyurethane linear polymer having a number average molecular weight of 25,000 to 55,000 and free isocyanate groups on the molecule ends thereof, coloring pigments and other additives to form a surface layer, so that the amount of said solid content on the mold is 0.7 to 6.5 mg/cm$^2$;

(b) coating said surface layer with a solvent diluted solution having a solid content of 30 to 80% which contains a polyurethane prepolymer having free isocyanate groups on the molecule ends thereof, which obtained by reacting a first polyol having an average functional group number of 2.0 to 3.0 with organic diisocyanates, a second polyol having an average functional group number of 2.0 to 3.0, a coloring pigment and other additives to form an intermediate reinforcing layer so that the amount of solid content on said surface layer is 10 to 75 mg/cm$^2$; and further (c) pouring a semi-rigid polyurethane foam-forming liquid comprising polyols, polyisocyanates and other aditives into the mold to form a core layer;

(d) foaming and curing, whereby said surface layer, intermediate reinforcing layer and core layer are simultaneously formed into an integrally molded foam; and finally (e) removing said molded foam from the mold.

11. The process according to claim 10 wherein the linear polyurethane forming the surface layer is obtained by reacting a bifunctional polyol with an aliphatic diisocyanate.

12. The process according to claim 11 wherein the bifunctional polyol is a polyester diol having a molecular weight of 1,000 to 3,000 and containing two hydroxyl groups on the molecule ends thereof.

13. The process according to claim 11 wherein the aliphatic diisocyanate is at least one member selected from the group consisting of hexamethylene diisocyanate, isophorone diisocyanate and m-xylene diisocyanate.

14. The process according to claim 10 wherein the first polyol is reacted with the organic diisocyanate in an amount of 1.5 to 4.0 equivalents per an equivalent of the first polyol.

15. The process according to claim 10 wherein the average equivalent weight per each functional group of the first and second polyols is 200 to 1,500.

16. The process according to claim 10 wherein the first polyol is a bifunctional polyol and at least a part of the second polyol is a trifunctional group.

17. The process according to claim 10 wherein at least a part of the first polyol is a trifunctional polyol and the second polyol is a bifunctional polyol.

18. The process according to claim 10 wherein the organic diisocyanate is an aliphatic or aromatic diisocyanate.

19. The process according to claim 10 wherein the organic diisocyanate is at least one member selected from the group consisting of hexamethylene diisocyanate, isophorone diisocyanate, m-xylene diisocyanate, phenylene diisocyanate, tolulene diisocyanate, diphenylmethane diisocyanate and napththalene diisocyanate.

20. The process according to claim 10 wherein the free isocyanate group content in the urethane prepolymer is 2.5 to 7.5%.

21. The process according to claim 10 wherein the semi-rigid polyurethane foam-forming liquid is poured in the mold in an amount so that the volume of the foam obtained by blowing the foam-forming liquid in an open vessel is not larger than 5.5 times the volume of the inner cavity of the mold.

22. The process according to claim 10 wherein the semi-rigid polyurethane foam-forming liquid does not contain a halogenated hydrocarbon as a blowing agent in an amount exceeding 10%.

23. The process according to claim 10 wherein the temperature of the mold is higher than 35° C. when the semi-rigid polyurethane foam-forming liquid is poured into the mold.

24. A flexible molded foam as set forth in claim 1 wherein the surface layer and intermediate layer are chemically bonded by free isocyanate groups on the molecule ends of the polyurethane linear polymer of the surface layer.

25. The process according to claim 10, wherein the curing of step (d) chemically bonds the surface layer to the intermediate layer by the free isocyanate groups on the molecule ends of the polyurethane linear polymer defined by step (a).

26. A flexible molded foam comprising:
(a) a surface layer of elastic thin film having a thickness of 7 to 50μ, which consists essentially of a polyurethane polymer having a number average molecular weight of 25,000–55,000;
(b) an intermediate reinforcing layer of elastic film having a thickness of 100 to 500μ, which comprises a three-dimensionally cross-linked polyurethane; and
(c) a core layer which comprises a semi-rigid polyurethane foam having an apparent density of 0.03 to 0.30 g/cm$^3$;
wherein said layers are integrally molded in a desirable shape and wherein the surface layer has free isocyanate groups on the molecule ends of the polyurethane linear polymer prior to curing.

* * * * *